E. GERRY.
Anti-Friction Rollers.

No. 159,754. Patented Feb. 16, 1875.

WITNESSES:
P. C. Dieterich
H. C. Scott

INVENTOR.
Edson Gerry per
C. H. Watson & Co.
ATTORNEYS.

UNITED STATES PATENT OFFICE.

EDSON GERRY, OF GARDEN CITY, MINNESOTA.

IMPROVEMENT IN ANTI-FRICTION ROLLERS.

Specification forming part of Letters Patent No. 159,754, dated February 16, 1875; application filed February 4, 1875.

*To all whom it may concern:*

Be it known that I, EDSON GERRY, of the town of Garden City, in the county of Blue Earth and State of Minnesota, have invented certain new and useful Improvements in Journals and Boxes for Wheels, Hubs, and Machinery; and I do hereby declare that the following is a full, clear, and exact description thereof, reference being had to the accompanying drawings and to the letters of reference marked thereon, which form a part of this specification.

The nature of my invention consists in the construction and arrangement of a journal-bearing designed for wheel-hubs and machinery of any description, as will be hereinafter more fully set forth.

In order to enable others skilled in the art to which my invention appertains to make and use the same, I will now proceed to describe its construction and operation, referring to the annexed drawing, in which—

Figure 1:
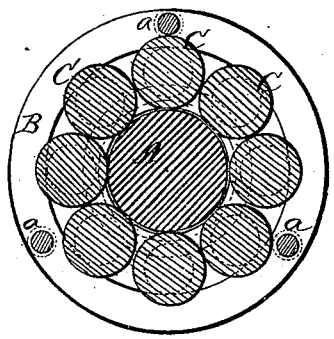
Figure 2:
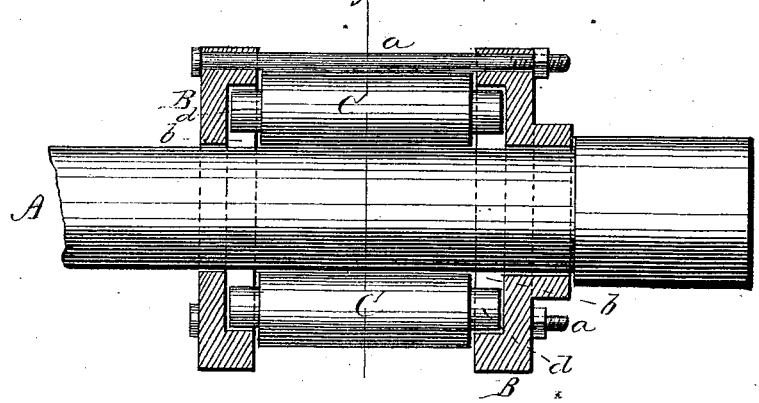
Figure 3:
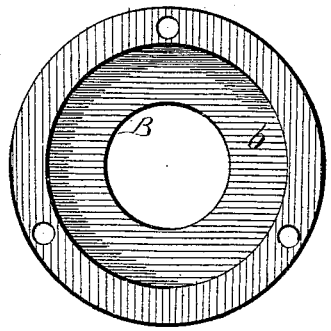

Figure 1 is a transverse section of my journal box or bearing through the line $x$ $x$ of Fig. 2. Fig. 2 is a longitudinal section of the same, and Fig. 3 is an inside view of one of the rims.

A represents the shaft or journal, which is passed through two circular disks or rims, B B, of any suitable diameter. The disks or rims B B are connected by means of bolts $a$ $a$, and the inner side of each rim is provided with a circular recess, $b$, concentric with the rim and with the opening for the journal A. C C represent a series of rollers, each of which is, at the ends, provided with projecting journals $d$ $d$, and these journals are inserted in the recesses $b$ $b$ upon the disks or rims B B. After the rollers have been inserted the bolts $a$ $a$ are tightened up sufficiently to bring the parts in proper position. As the shaft or journal A revolves the rollers C C not only revolve upon their axis, but they also move with the journal A in the rims B B, and thus reduce the friction to the lowest possible amount, and prevent the journal or the box from becoming heated.

I am aware that a shaft or journal revolving in the center of a series of rollers is, broadly speaking, not new, and I do, therefore, not claim such as my invention, my improvement consisting in having the rollers revolving and moving with the journal in recessed rims, which hold the rollers to the journal.

This device is applicable to hubs for wheels, shaft-bearings, and journal-boxes generally for any kind of machinery.

Having thus fully described my invention, what I claim as new, and desire to secure by Letters Patent, is—

The combination, with a shaft or journal, A, of the rims B B, provided with the circular recess $b$ $b$, open toward the journal and connected by means of bolts $a$ $a$, and the rollers C C, provided with journals $d$ $d$, placed in the recesses $b$ $b$, the rollers revolving on their axis and moving with the journal A, substantially as and for the purposes herein set forth.

In testimony that I claim the foregoing as my own invention I affix my signature in presence of two witnesses.

EDSON GERRY.

Witnesses:
 W. H. TAYLOR,
 G. B. TREADEWELL.